United States Patent
Burckhardt et al.

(10) Patent No.: US 9,340,682 B2
(45) Date of Patent: May 17, 2016

(54) WATER BASED EPOXY RESIN PRIMER

(75) Inventors: Urs Burckhardt, Zürich (CH);
Wolf-Rüdiger Huck, Gockhausen (CH);
Reto Fässler, Zürich (CH); Antonio Corsaro, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/116,047

(22) PCT Filed: Jun. 7, 2012

(86) PCT No.: PCT/EP2012/060830
§ 371 (c)(1),
(2), (4) Date: Nov. 6, 2013

(87) PCT Pub. No.: WO2012/168385
PCT Pub. Date: Dec. 13, 2012

(65) Prior Publication Data
US 2014/0179829 A1  Jun. 26, 2014

(30) Foreign Application Priority Data
Jun. 8, 2011  (EP) .................................... 11169185

(51) Int. Cl.
| | |
|---|---|
| *C09J 163/00* | (2006.01) |
| *C09J 11/06* | (2006.01) |
| *C09J 11/08* | (2006.01) |
| *C09J 175/04* | (2006.01) |
| *C09J 179/02* | (2006.01) |
| *C09J 5/00* | (2006.01) |
| *B05D 5/10* | (2006.01) |
| *C08G 59/50* | (2006.01) |
| *C09D 163/00* | (2006.01) |
| *C09D 5/00* | (2006.01) |

(52) U.S. Cl.
CPC ................ *C09D 5/002* (2013.01); *C08G 59/50* (2013.01); *C09D 163/00* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 4,480,083 A | 10/1984 | Tortorello et al. | |
| 8,067,486 B1 * | 11/2011 | Zhao | ............................ 523/415 |
| 8,389,772 B2 | 3/2013 | Burckhardt | |
| 2010/0297357 A1 | 11/2010 | Mowrer et al. | |
| 2011/0027591 A1 | 2/2011 | Braun et al. | |
| 2011/0027592 A1 * | 2/2011 | Molnar et al. | ................ 428/414 |

FOREIGN PATENT DOCUMENTS

| | | |
|---|---|---|
| CN | 101778814 A | 7/2010 |
| EP | 0 567 831 A1 | 11/1993 |
| EP | 2 336 213 A1 | 6/2011 |
| WO | WO 01/77202 A1 | 10/2001 |
| WO | WO 2008/037780 A2 | 4/2008 |
| WO | 2009/027510 A1 | 3/2009 |
| WO | WO 2010/112537 A1 | 10/2010 |

OTHER PUBLICATIONS

Air Products, Ancarez AR500 Data Sheet (Mar. 2006).*
Feb. 20, 2013 International Search Report issued in International Application No. PCT/EP2012/060830.
Dec. 27, 2013 International Preliminary Report on Patentability Issued in International Application No. PCT/EP2012/060830.
Jun. 3, 2015 Office Action issued in Chinese Application No. 201280026013.5.
Feb. 16, 2016 Office Action issued in Chinese Patent Application No. 201280026013.5.

\* cited by examiner

*Primary Examiner* — Mark Kaucher
*Assistant Examiner* — Kregg Brooks
(74) *Attorney, Agent, or Firm* — Oliff PLC

(57) ABSTRACT

The present invention relates to a adhesion promoter composition containing at least one aqueous dispersion of a solid epoxy resin; at least one polyamine; and at least one Compound V in free or hydrolytically releasable form which can enter into a condensation reaction with the polyamine. Adhesion promoter compositions according to the invention lead to an improvement in the adhesion under hot, humid conditions.

8 Claims, No Drawings

WATER BASED EPOXY RESIN PRIMER

TECHNICAL FIELD

The invention relates to the field of adhesion promoter compositions and their use as undercoatings for binding materials and sealants.

PRIOR ART

Adhesion promoter compositions have been used for a long time to improve the adhesion of binding materials and sealants on different substrates. Particularly high requirements for adhesion are made on bonding in the automotive industry, the use of adhesion promoter compositions in this area is very widespread.

Typically, such adhesion promoter compositions contain volatile organic compounds (VOCs) as a solvent, which evaporate during application and are disadvantageous on the basis of environmental, health and occupational safety. Therefore efforts are being made to replace solvent-bearing adhesion promoter compositions by aqueous ones. Under hot, humid conditions, for example in cataplasma storage, aqueous adhesion promoter compositions, however, tend to further lose their adhesion in the adhesive bond. WO 2008/037780, for example, describes an aqueous adhesion promoter composition with relatively good stability under hot, humid conditions. It provides a two-component system consisting of an epoxy resin dispersion and an amine curing agent. With extended cataplasma storage, however, even this adhesion promoter composition also shows loss of adhesion.

SUMMARY OF THE INVENTION

The object of the present invention is therefore to provide a adhesion promoter composition that does not release any or only insignificant volatile organic compounds and at the same time does not lead to a loss of adhesion under hot, humid conditions.

This object is achieved by a adhesion promoter composition according to claim 1 of the invention.

Surprisingly, and contrary to the expectation that compounds V would reduce the crosslink density of the adhesion promoter composition by blocking reactive amino groups, whereby they could soften and swell, which in turn could result in loss of adhesion as well as increased incidence of corrosion especially under load on the adhesive bond under hot, humid conditions, it has been found that the use of specific compounds as additives in the adhesion promoter composition significantly improves its stability under hot, humid conditions.

Additional aspects of the invention are the subject matter of further independent claims. Especially preferred embodiments of the invention are the subject matter of the dependent claims.

METHODS OF IMPLEMENTING THE INVENTION

The present invention relates to a adhesion promoter composition, containing
- at least one aqueous dispersion of a solid epoxy resin;
- at least one polyamine; and
- at least one compound V in free or hydrolytically releasable form which can enter into a condensation reaction with the polyamine.

Substance names that begin with "poly-", such as polyamine or polyisocyanate, refer in the present document to substances formally containing two or more functional groups per molecule going by this name.

Accordingly, in the present document a "polyamine" is understood to be compounds containing two or more amino groups.

The term "polymer" in the present document refers on the one hand to a collection of macromolecules that are chemically uniform but are different with respect to the degree of polymerization, molecular weight, and chain length and that are produced by a polyreaction (polymerization, polyaddition, polycondensation). On the other hand, this term also includes derivatives of such a collection of macromolecules from polyreactions, i.e., compounds obtained by reactions, such as, for example, additions or substitutions of functional groups on predetermined macromolecules and which may be chemically uniform or chemically heterogeneous. This term additionally also includes so-called prepolymers, i.e., reactive oligomeric pre-adducts whose functional groups are involved in the structure of the macromolecules.

The term "cataplasma storage" in the present document means storage of a sample at a temperature of 70° C. and a relative humidity of 100%.

The term "molecular weight" in the present document always refers to the average molecular weight $M_n$ (numerical average).

The solid epoxy resin of the aqueous dispersion in particular involves a solid epoxy resin with the formula (I).

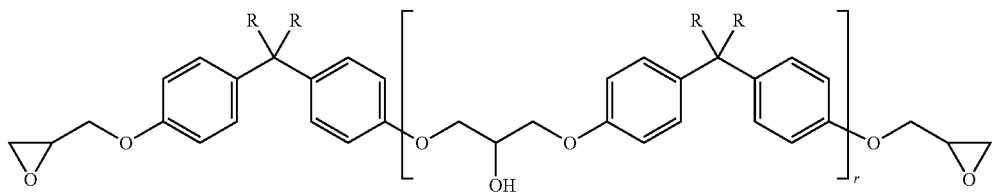

Here, the substituents R, independently of one another, stand either for a hydrogen atom or a methyl group. In addition, the subscript r stands for a value of >1, in particular ≥1.5. Preferably, r stands for a value of 2 to 12.

Typically, a solid epoxy resin has a glass transition temperature that is higher than a room temperature of about 23° C. Solid epoxy resins can therefore be pulverized into free-flowing bulk powders at room temperature.

Such solid epoxy resins as such or in a dispersed form, are already available commercially from Dow Chemical Company, USA, Huntsman International LLC, USA, or from Hexion Specialty Chemicals Inc., USA, for example.

Also suitable are, for example, solid epoxy resins that exhibit, at least partially, N-glycidyl groups in place of glycidyl ether groups, and epoxy resins based on aliphatic glycidyl ethers.

Also suitable are solid epoxy resins from the group of phenolic resins, particularly phenol- or cresol novolacs.

Optionally, the aqueous dispersion of a solid epoxy resin contains further constituents, such as liquid epoxy resins, emulsifiers, co-emulsifiers, anti-frothing agents, biocides, pigments, fillers, reactive diluents, or catalysts.

The aqueous dispersion of a solid epoxy resin preferably exhibits a content of solid epoxy resin from 30 to 80% by weight, in particular 50 to 70% by weight. Accordingly, the aqueous dispersion of an epoxy resin exhibits, in particular, about 20 to 70% by weight of water.

The average particle size of the dispersed particles of solid epoxy resin in the dispersion is in particular in the range of 0.05 to 20 μm, especially 0.1 to 10 μm, particularly preferably 0.2 to 5 μm.

For example, suitable aqueous dispersions of a solid epoxy resin are available commercially under the trade name Waterpoxy® 1422 from Cognis or under the trade name Ancarez™ AR555 Waterborne Epoxy Resin from Air Products.

The proportion of the aqueous dispersion of a solid epoxy resin is preferably 30 to 99% by weight, especially 40 to 80% by weight, based on the total adhesion promoter composition.

Furthermore, the adhesion promoter composition according to the invention includes at least one polyamine.

Suitable polyamines are described, for example in the European patent application EP09178262.3, the contents of which are herewith incorporated in reference.

Preferably, the polyamine is a reaction product, especially a polyamidoamine or an epoxy resin/polyamine addition product.

Preferably, the polyamine is a polyamidoamine. For example, these are condensation products of carboxylic acids and polyamines, for instance a fatty acid or a polycarboxylic acid and a polyalkylene amine.

Especially suitable polyamines are addition products of epoxy resins and polyamines. Such addition products can be obtained, for example, from a plurality of possible polyamines and epoxy resins known to the person skilled in the art, in particular bisphenol A diglycidyl ether. In this context, preferred polyamines are ethylene diamine, isophorone diamine, 2,2,4- and 2,4,4-trimethyl hexamethylene diamine, 1,3-xylylene diamine, polyalkylene amines such as polyethylene amine or polyoxyalkylene diamine or -triamine, especially those that can be obtained from Huntsman under the trade name Jeffamine®. Preferably, the reaction product is that of a diglycidyl ether of bisphenol A and/or bisphenol F with a polyoxyalkylene diamine or polyoxyalkylene triamine. A particularly suitable addition product is the one described in EP 0567831 as bis-(diamine)-diepoxy adduct.

It is quite possible and may even be advantageous to use a mixture of different polyamines in the adhesion promoter composition according to the invention. Optionally, mixtures of polyamines with mercapto group-bearing compounds can be used.

The proportion of the polyamine is chosen in particular so that the ratio of amino groups to epoxide groups in the adhesion promoter composition is in the range of 0.1:1 to 1:1.

Preferably, the proportion of the polyamine is 1 to 40% by weight, especially 5 to 20% by weight, based on the total adhesion promoter composition.

Furthermore, the adhesion promoter composition according to the invention includes at least one compound V in free or hydrolytically releasable form, which can enter into a condensation reaction with the polyamine.

In particular, said compound V involves a carbonyl compound. Aldehydes, β-diketones, β-keto esters and β-keto amides are preferred as carbonyl compound.

The proportion of the compound V is preferably 0.1 to 10% by weight, especially 0.2 to 5% by weight, based on the total adhesion promoter composition.

Suitable aldehydes on the one hand, are aldehydes which are liquid at room temperature, especially propanal, 2-methylpropanal, butanal, 2-methylbutanal, 2-ethylbutanal, pentanal, pivalaldehyde, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxy acetaldehyde, cyclopropane carboxaldehyde, cyclopentane carboxaldehyde, cyclohexane carboxaldehyde; 2,2-dimethyl-3-phenylpropanal, 1-naphthaldehyde, benzaldehyde or substituted benzaldehydes, especially the isomers of tolualdehyde, salicylaldehyde, and m-phenoxy-benzaldehyde; and cinnamaldehyde.

Especially suitable as an aldehyde are, on the other hand, aldehydes with the formula (II).

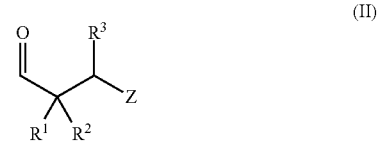

Here, $R^1$ and $R^2$, independently of one another, either stand for a monovalent hydrocarbon radical with 1 to 12 C atoms, or stand together for a divalent hydrocarbon radical with 4 to 12 C atoms that is part of an optionally substituted carbocyclic ring with 5 to 8, preferably 6, C atoms. Preferably $R^1$ and $R^2$ each stand for a methyl radical.

Furthermore, $R^3$ stands for a hydrogen atom or for an arylalkyl or cycloalkyl or alkyl group with 1 to 12 C atoms, particularly for a hydrogen atom.

Z stands for an ester, ether, tertiary amino, or amido group with up to 31 C atoms, whereby optionally this exhibits additional ether oxygen atoms. Preferably, Z stands for a radical with formula (III) or (IV),

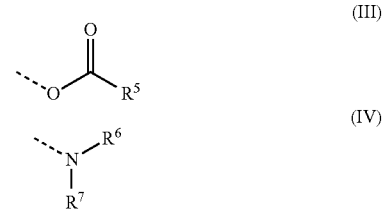

wherein $R^5$ stands either for a hydrogen atom or a linear or branched alkyl radical with 1 to 30 C atoms, optionally with cyclic portions and optionally with at least one heteroatom, especially oxygen in the form of ether, carbonyl or ester groups.

Furthermore, $R^5$ can stand for a mono- or polyunsaturated, linear or branched hydrocarbon radical with 5 to 30 C atoms or for an optionally substituted aromatic or heteroaromatic 5- or 6-membered ring.

Preferably, $R^5$ stands for a linear or branched alkyl radical with from 6 to 30, especially with 11 to 30, C atoms, optionally with cyclic portions and optionally with at least one heteroatom, or a mono- or polyunsaturated, linear or branched hydrocarbon radical with 6 to 30, especially with 11 to 30, C atoms.

$R^6$ and $R^7$, independently of one another, each stand for a hydrogen atom, an alkyl, cycloalkyl, aryl, or arylalkyl group with 1 to 12 C atoms, which optionally exhibits ether groups or halogen atoms, or together stand for a divalent hydrocarbon radical, which is part of a, optionally substituted, carbocyclic ring with 5 to 8, preferably 5 or 6, C atoms.

Preferably, $R^6$ and $R^7$, independently of one another, each stand for a methyl, ethyl, propyl, isopropyl, butyl, isobutyl, 2-ethylhexyl, cyclohexyl, benzyl, or alkoxy ethyl group, or together form, including the nitrogen atom, a ring, especially a pyrrolidine, piperidine, morpholine, or N-alkylpiperazine ring, in which this ring is optionally substituted. Particularly preferably $R^6$ and $R^7$, independently of one another, each stand for a benzyl or methoxyethyl group, or, together with the inclusion of the nitrogen atom, form a morpholine ring.

Preferred are aldehydes of formula (II), which are liquid at room temperature.

Aldehydes of formula (II) which exhibit a radical of formula (III) as the radical Z represent esters of aliphatic, cycloaliphatic, or arylaliphatic, 2,2-disubstituted, 3-hydroxy aldehydes such as, in particular, 2,2-dimethyl-3-hydroxypropanal with suitable carboxylic acids, wherein the following are particularly suitable as the carboxylic acid: saturated aliphatic carboxylic acids such as, in particular, formic acid, acetic acid, propionic acid, butyric acid, isobutyric acid, valeric acid, caproic acid, 2-ethylcaproic acid, oenanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid; mono-unsaturated aliphatic carboxylic such as palmitoleic acid, oleic acid, erucic acid; polyunsaturated aliphatic carboxylic acids such as linoleic acid, linolenic acid, eleostearic acid, arachidonic acid; cycloaliphatic carboxylic acids such as cyclohexanecarboxylic acid; arylaliphatic carboxylic acids such as phenylacetic acid; aromatic carboxylic acids such as benzoic acid, naphthoic acid, toluic acid, anisic acid; isomers of these acids; fatty acid mixtures from the industrial hydrolysis of natural oils and fats such as rapeseed oil, sunflower oil, linseed oil, olive oil, coconut oil, palm kernel oil, and palm oil; as well as dicarboxylic acid monoalkyl and aryl esters such as those obtained by the simple esterification of dicarboxylic acids such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid; 3,6,9-trioxaundecanedioic acid, and similar derivatives of polyethylene glycol, with alcohols such as methanol, ethanol, propanol, butanol, and higher homologues and isomers of these alcohols. Preferred are carboxylic acids having at least 7 C atoms, especially those with 12 to 31 C atoms, particularly lauric acid, myristic acid, palmitic acid, stearic acid, and oleic acid. Especially preferred is lauric acid.

Preferably, the aldehyde is selected from the group consisting of 2-ethylbutanal, pentanal, pivalic aldehyde, 2-methylpentanal, 3-methylpentanal, 4-methylpentanal; 2,3-dimethylpentanal, hexanal, 2-ethylhexanal, heptanal, octanal, methoxyacetaldehyde, 2,2-dimethyl-3-phenylpropanal, benzaldehyde, 1-naphthaldehyde, salicylic aldehyde, and aldehydes of formula (II), especially 3-acetoxy-2,2-dimethylpropanal; 2,2-dimethyl-3-lauroyloxypropanal; 2,2-dimethyl-3-(N-morpholino)-propanal, and 2,2-dimethyl-3-bis(methoxyethyl)-aminopropanal.

Especially preferred is the aldehyde selected from the group consisting of benzaldehyde, salicylaldehyde; 2,2-dimethyl-3-phenylpropanal; 3-acetoxy-2,2-dimethylpropanal; 2,2-dimethyl-3-lauroyloxypropanal, and 2,2-dimethyl-3-(N-morpholino)-propanal.

As the aldehyde, especially preferred are aldehydes of formula (II) which exhibit a radical of formula (III) as radical Z, wherein $R^5$ exhibits 11 to 30 C atoms, especially 11 to 20 C atoms. Most preferred is 2,2-dimethyl-3-lauroyloxypropanal. These aldehydes are odorless substances. An "odorless" substance is understood to be a substance that cannot be smelled by most human individuals, which therefore exhibits no perceptible odor. When using such aldehydes, adhesion promoter compositions are available that are odorless and release no VOCs.

Suitable as β-diketones are especially those with formula (V)

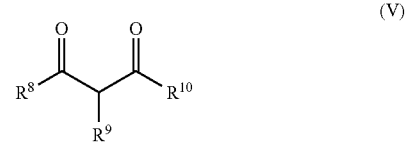

On the one hand, $R^8$ and $R^{10}$, independently of one another, each stand for an alkyl, cycloalkyl, aryl, or arylalkyl group with 1 to 12 C atoms, which optionally exhibit ether groups or halogen atoms, and $R^9$ stands for a hydrogen atom or an alkyl, cycloalkyl, aryl, or arylalkyl group with 1 to 12 C atoms.

On the other hand, $R^8$ and $R^9$ together stand for a divalent hydrocarbon radical, which is part of an optionally substituted carbocyclic ring with 5 to 8, preferably 5 or 6, C atoms, and $R^{10}$ stands for an alkyl, cycloalkyl, aryl, or arylalkyl group with 1 to 12 C atoms, which optionally exhibits ether groups or halogen atoms.

Preferred β-diketones of formula (V) are in particular selected from the group consisting of 2,4-pentanedione; 2,4-pentanedione alkylated in the 3-position, and therefore, in particular, 3-methyl-, 3-ethyl-, 3-propyl-, 3-isopropyl, 3-butyl-, 3-tertbutyl-, 3-cyclohexyland 3-phenyl-2,4-pentanedione; 1,1,1-trifluoro-2,4-pentanedione; 1,1,1,5,5,5-hexafluoro-2,4-pentanedione; 3,5-heptanedione; 3,5-octanedione; 2,4-octanedione; 6-methyl-3,5-heptanedione; 2,2,6,6-tetramethyl-3,5-heptanedione; 2,2,4,6,6-pentamethyl-3,5-heptanedione; 1-phenyl-1,3-butanedione, 2-acetylcyclopentanone; 2-acetylcyclohexanone; 2-benzoylcyclopentanone, and 2-benzoylcyclohexanone. Particularly preferred is 2,4-pentanedione.

Particularly suitable as a β-ketoester are β-ketoesters with formula (VI).

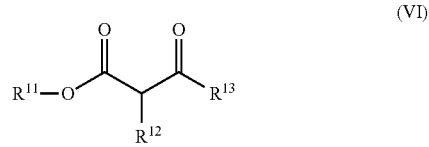

$R^{11}$ stands for a linear or branched alkyl group with 1 to 6 C atoms, preferably for a tertbutyl group.

$R^{12}$ and $R^{13}$ independent of one another, each stand for a hydrogen atom, an alkyl, cycloalkyl, aryl, or arylalkyl group with 1 to 12 C atoms, which optionally exhibits ether groups or halogen atoms, or they stand together for a divalent hydrocarbon radical, which is part of an optionally substituted, carbocyclic ring with 5 to 8, preferably 5 or 6, C atoms. In particular, $R^{12}$ stands for a hydrogen atom, and $R^{13}$ stands for a methyl group.

Particularly suitable as β-ketoamides are β-ketoamides with formula (VII).

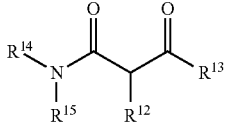

(VII)

$R^{12}$ and $R^{13}$ independently correspond to the radicals that were previously [sic] in β-ketoesters of formula (VI).

$R^{14}$ and $R^{15}$, independently of one another, each stand for a hydrogen atom, an alkyl, cycloalkyl, aryl, or arylalkyl group with 1 to 12 C atoms, which optionally exhibit ether groups or halogen atoms or together stand for a divalent hydrocarbon radical, which is part of an optionally substituted, carbocyclic ring with 5 to 8, preferably 5 or 6, C atoms.

Compound V can also be a multifunctional compound, which exhibits two or more carbonyl groups contained in the carbonyl compounds described above, wherein these carbonyl groups need not necessarily be identical within one molecule. For example, a dialdehyde is suitable as a compound V, such as terephthalaldehyde or a polyol whose hydroxyl groups are completely acetoacetylated.

Compound V can also be contained in hydrolytically releasable form in the adhesion promoter composition, instead in a free form.

Especially suitable as compounds that release a compound V following hydrolysis are aldimines, enamines, or oxazolidines.

Preferably, compound V in a hydrolytically releasable form is an aldimine with formula (VIII),

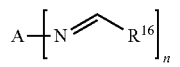

(VIII)

Here, n stands for a value from 1 to 4, especially 2 or 3.

A stands for an n-valent hydrocarbon radical with 2 to 30 C atoms, which optionally contains at least one heteroatom, especially in the form of ether oxygen or tertiary amine nitrogen.

In particular, A stands for a radical of an amine after removal of n amino groups. Preferred amines are selected from the group consisting of 1,6-hexamethylenediamine; 1,5-diamino-2-methylpentane 1,3-pentanediamine, isophoronediamine; 2,2,4- and 2,4,4-trimethylhexamethylenediamine; 1,3-xylylenediamine; 1,3-bis-(aminomethyl)-cyclohexane, bis-(4-aminocyclohexyl)-methane, bis-(4-amino-3-methylcyclohexyl)-methane, 3(4), 8(9)-bis-(aminomethyl)-tricyclo[5.2.1.0$^{2,6}$]decane; 1,2-, 1,3-, and 1,4-diaminocyclohexane; 1,4-diamino-2,2,6-trimethylcyclohexane; 3,6-dioxaoctane-1,8-diamine; 4,7-dioxadecane-1,10-diamine, 4-aminomethyl-1,8-octanediamine, polyoxyalkylene-polyamines with two or three amino groups and a molecular weight of up to 600 g/mol, especially the types D-230, D-400, and T-403 from Huntsman available under the trade name Jeffamine®, and analogous compounds thereof available from BASF or Nitroil; 1,3- and 1,4-phenylenediamine; 2,4- and 2,6-toluenediamine; 4,4'-, 2,4'-, and 2,2'-diaminodiphenylmethane; 3,3'-dichloro-4,4'-diaminodiphenylmethane, and mixtures of the amines cited.

$R^{16}$ stands for a radical of an aldehyde, such as has been described above, after removal of the aldehyde group.

Other suitable aldimines are, for example, those described as polyaldimines PA in WO 2010/112,537. Also suitable as an aldimine are commercial aldimines such as Vestamin® A-139 (from Evonik), for example.

In addition, compound V in hydrolytically releasable form is preferably an enamine. Such an enamine is obtainable in particular from the condensation reaction of an amine having at least one secondary amino group and at least one aldehyde, which exhibit at least one hydrogen atom in α-position to the carbonyl group and thus is enolizable, especially acetaldehyde, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropane carboxaldehyde, cyclopentane carboxaldehyde, cyclohexane carboxaldehyde, or diphenylacetaldehyde. Suitable as an amine exhibiting at least one secondary amino group are, on the one hand, amines having at least two secondary amino groups, especially piperazine, 2,5- and 2,6-dimethylpiperazine, 2,3,5,6-tetramethylpiperazine, 1,7-dioxa-4,10-diazacyclododecane, N,N'-dibutylethylenediamine; N,N'-di-tertbutyl-ethylenediamine; N,N'-dimethyl-1,6-hexanediamine; N,N'-diethyl-1,6-hexanediamine, N,N'-dimethyl diethylenetriamine; N,N'-dimethyl dipropylenetriamine; 1-(1-methylethylamino)-3-(1-methylethylamino-methyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)-cyclohexyl)-methane; 4,4'-trimethylene-dipiperidine, and N-alkylated polyetheramines, for example Jeffamine® SD-231 (from Huntsman); furthermore, amines with a hydroxyl group and a secondary amino group, especially N-(2-hydroxyethyl)-piperazine, 4-hydroxypiperidine, as well as monoalkoxylated primary monoamines, such as, in particular, N-methyl-ethanolamine, N-ethyl-ethanolamine, N-butyl-ethanolamine, and N-butyl-isopropanolamine, furthermore amines with a mercapto group and a secondary amino group, especially N-(2-mercaptoethyl)-piperazine, 4-mercaptopiperidine, and 2-mercaptoethyl butylamine.

Furthermore, an oxazolidine is preferred as a compound V in hydrolytically releasable form. Such an oxazolidine is obtainable particularly from the condensation reaction of at least one hydroxyamine, in which the hydroxyl and primary or secondary amino groups are separated by an optionally substituted ethylene or propylene radical, with at least one aldehyde, in particular formaldehyde, or one of the enolizable aldehydes cited above. Particularly suitable are 2-methylpropanal and 2-ethylhexanal. Suitable as hydroxyamine are particularly diethanolamine and diisopropanolamine, which lead to hydroxyoxazolidines from which polyoxazolidines can be produced easily, for example by reaction with a polyisocyanate or a polyester.

Suitable commercial oxazolidines are, for example, curing agents OZ and Desmophen® VP LS 2959 (from Bayer), Zoldine® ZA-78, and Zoldine® ZE (from Dow Chemical), Zoldine® RD-4 and Zoldine® RD-20 (from Angus Chemical) and Incozol® 2, Incozol® 3, Incozol® LV, Incozol® 4, Incozol® HP, Incozol® CF, Incozol® NC, and Incozol® K (from Incorez).

In a preferred embodiment of the adhesion promoter composition according to the invention the compound V is present in hydrolytically releasable form in the adhesion promoter composition. Most preferred as compounds that release the compound V following hydrolysis, are aldimines, enamines, and oxazolidines.

This preferred embodiment has the advantage that compound V is released in a delayed manner when applying the adhesion promoter composition and thus ensures undisturbed curing of the solid epoxy resin with the polyamine.

The adhesion promoter composition according to the invention preferably contains additional ingredients, such as are used in adhesion promoter compositions and are described, for example, in WO 2008/037780, in particular compounds such as those that are described therein as Epoxysilane ES or ESx, Aminosilane AS or ASx, or Mercaptosilane MS.

Particularly preferably, the adhesion promoter composition contains silanes, optionally at least partly in the form of their siloxanes, as well as pigments. Preferred silanes are epoxysilanes, especially 3-glycidoxypropylsilanes and aminosilanes, especially 3-aminopropylsilane and N-(2-aminoethyl)-3-aminopropylsilane, adducts of epoxysilanes and aminosilanes, as well as mercaptosilanes, especially 3-mercaptopropylsilane.

Preferred pigments are iron pigments and in particular carbon black.

The adhesion promoter composition according to the invention is used especially as a two-component system, wherein the aqueous dispersion of the solid epoxy resin is included in the first component, and the polyamine is included in the second component. Compound V can be included in the first or in the second component or in both components. Optionally, compound V can be used as a separate component, i.e., as a third component. If it is included in the second component, it reacts at least partially with amino groups of the polyamine, thus forming the corresponding condensation products.

Preferably, the adhesion promoter composition is a two-component adhesion promoter composition consisting of
  a first component K1, containing
    at least one aqueous dispersion of a solid epoxy resin; as well as
    at least one compound V in free or hydrolytically releasable form, which can enter into a condensation reaction with the polyamine; and
  a second component K2, containing
    at least one polyamine.

Furthermore, the adhesion promoter composition is preferred as a two-component adhesion promoter composition consisting of
  a first component K1, containing
    at least one aqueous dispersion of a solid epoxy resin; and
  a second component K2, containing
    at least one polyamine; as well as
    at least one compound V in hydrolytically releasable form, which can enter into a condensation reaction with the polyamine.

After the preparation, the individual components are typically packaged separately in sealed packages. Separated from one another, the individual components are stable in storage. The storage of the adhesion promoter composition according to the invention occurs particularly at temperatures in the range of 5 to 30° C. This ensures the stability of the aqueous dispersion of the solid epoxy resin.

The present invention in addition relates to the use of an adhesion promoter composition as has been described above, as a undercoating for adhesives, sealants, or coatings.

The use of such an adhesion promoter composition improves the adhesion of the adhesive, sealant, or coating in hot, humid conditions, especially after cataplasma storage. Preferably, the adhesion promoter composition is used as a undercoating for adhesives or sealants.

Application of the adhesion promoter composition according to the invention typically occurs by means of a cloth, felt, roller, spray, sponge, brush, dip coating, or the like and can be done either manually or by means of a robot.

If the adhesion promoter composition is a multi-component adhesion promoter composition, mixing of the components takes place before or during the application.

After the application, the adhesion promoter composition is usually exposed to air. Exposure to air can be performed under atmospheric conditions or in any case at elevated temperature, in vacuum, and/or by blowing with a gas, which can lead to a shortening of the air-exposure-time.

The adhesion promoter composition according to the invention is suitable for various types of substrate such as metals and alloys, especially steels, aluminum, and non-ferrous metals as well as their alloys, concrete, mortar, firebrick, clinker, natural stone, glass, vitreous ceramic, wood, and plastics such as polystyrene. Preferred as substrates are inorganic substrates, especially glass and vitreous ceramic, as well as concrete and mortar. If necessary, the substrates can be pretreated prior to the application of the adhesion promoter composition according to the invention. Such pretreatments include, in particular, physical and/or chemical cleaning procedures, for example grinding, sandblasting, brushing, or the like, or treatment with cleaning agents or solvents.

In principle, any conventional adhesive or sealant can be used as an adhesive or sealant. In particular, this is a moisture-curing adhesive or sealant.

Suitable adhesives and sealants are, in particular, polyurethane adhesives and sealants, especially those containing polyurethane polymers exhibiting isocyanate groups.

Furthermore, the adhesion promoter composition according to the invention is also especially suitable for silane-crosslinking adhesives and sealants.

The adhesion promoter composition according to the invention is especially suitable for elastic moisture-curing adhesives, such as those sold commercially under the product lines Sikaflex® and SikaBond® from Sika Schweiz AG.

Preferred areas of application of the adhesion promoter composition according to the invention include the construction and manufacturing industries as well as in vehicle construction, especially for sealing joints, gluing wood parquet, component bonding, sealing seams, sealing cavities, assembly, chassis bonding, bonding of sheets, and the like.

Items that are manufactured by bonding, sealing, or coating a substrate using a adhesion promoter composition according to the invention include, for example, structures, especially high-rise and underground structures, means of transportation, for examples vehicles, especially automobiles, buses, trucks, rail cars, or ships, or attachments thereto. Preferably, the adhesion promoter composition according to the invention is used for elastic bonding in the automotive industry, such as, for example, adhesion of parts such as plastic covers, trims, flanges, bumpers, operator's cabs, or other attachments, to the painted chassis of a means of transportation, or the gluing of glass windows into the chassis.

EXAMPLES

Exemplary embodiments are set forth below, which will serve to illustrate in more detail the invention described. Of course, the invention is not limited to the exemplary embodiments described.

Preparation of Compounds V

Compound V1:

100 g of a polypropylene glycol (PPG 400, Voranol® P400, Dow) were mixed in a flask with 80 g tertbutyl acetoacetate and the mixture was heated, while stirring and under vacuum, at 130° C., until no more tertbutanol condensed in the receptacle (about 4 hours). Yield: 138 g Compound V2:

Commercial oxazolidine Incozol® 2 (from Incorez).

Preparation of adhesion promoter compositions

Examples 1 and 2

Ancarez™ AR555 (from Air Products; 55% by weight solids content), a commercial aqueous dispersion of a solid epoxy resin, was used as Component K1.

Anquamine® 419 (from Air Products; 60% by weight solids content), a commercial aqueous amine curing agent that was diluted with deionized water to a solids content of 17% by weight, was used as Component K2.

For each example, a compound V was added to one of the two components, K1 or K2, in accordance with Table 1.

TABLE 1

Adhesion promoter compositions

|  | Reference | Example 1 | Example 2 |
|---|---|---|---|
| Component K1 |  |  |  |
| Ancarez ™ AR555 | 50 | 48.5 | 50 |
| Compound V1 |  | 1.5 |  |
| Component K2 |  |  |  |
| Anquamine ® 419 | 14.2 | 14.2 | 12.8 |
| deionized water | 35.8 | 35.8 | 32.2 |
| Compound V2 |  |  | 5 |

(Amounts in parts by weight)

Preparation of Cements

For the application of the adhesion promoter compositions, 50 parts by weight of component K1 were mixed for each example with 50 parts by weight of component K2, the mixture was applied onto the substrate (float glass from Rocholl GmbH, Germany; tin side) by means of saturated felt and flashed off for 60 minutes in the "standard atmosphere" (23±1° C., 50±5% relative humidity).

The commercial single-component polyurethane adhesive Sikaflex®-221 (Sika Schweiz AG) was applied onto the thus pretreated substrate by means of a cartridge gun as a triangular bead under standard atmosphere. The adhesive was tested for adhesion after a cure time of 7 days in the standard atmosphere ("RT"), and after subsequent cataplasma storage for 7 days ("CP").

The adhesion of the adhesive was determined by means of a bead test. For this purpose, an incision is made in the adhesive bead at the end just above the adhesive surface. The incised end of the bead is held with round-nosed pliers and pulled from the substrate. This is done by carefully rolling the bead on the tip of the pliers and making an incision down to the bare substrate perpendicular to the direction in which the bead is pulled. The rate at which the bead is pulled should be selected so that an incision has to be made approximately every 3 seconds. The test distance must be at least 8 cm. The adhesive (cohesion fracture) remaining on the substrate is estimated after pulling the bead off. The assessment of the adhesion properties occurs by visual determination of the cohesive component of the adhesive surface as a percentage. The suffix "P" in the rating denotes a detachment of the adhesion promoter or primers from the substrate or a cohesive fracture in the adhesive. The higher the proportion of cohesive fracture in the adhesive, the better the bonding is rated. Test results with cohesive fractures of less than 50%, especially less than 40%, are considered inadequate.

The results are shown in Table 2.

TABLE 2

Adhesion results

|  | Adhesion after RT | Adhesion after CP |
|---|---|---|
| Reference | 100 | 0P |
| Example 1 | 100 | 100 |
| Example 2 | 100 | 90P |

The invention claimed is:

1. A two-component adhesion promoter composition consisting of:
   a first component K1 comprising:
      at least one aqueous dispersion of a solid epoxy resin; and
      at least one compound V in hydrolytically releasable form, which can enter into a condensation reaction with a polyamine; and
   a second component K2 comprising:
      at least one polyamine,
   wherein the compound that releases compound V after hydrolysis is an aldimine, an enamine, or an oxazolidine.

2. The adhesion promoter composition according to claim 1, wherein the aqueous dispersion of a solid epoxy resin exhibits a content of solid epoxy resin from 30 to 80% by weight.

3. The adhesion promoter composition according to claim 1, wherein the average particle size of the dispersed particles of solid epoxy resin in the dispersion is in a range of 0.05 to 20 μm.

4. The adhesion promoter composition according to claim 1, wherein the proportion of the aqueous dispersion of a solid epoxy resin is 30 to 99% by weight, based on the total adhesion promoter composition.

5. The adhesion promoter composition according to claim 1, wherein the proportion of the polyamine is selected so that a ratio of amino groups to epoxy groups occurs in a range of 0.1:1 to 1:1 in the adhesion promoter composition.

6. The adhesion promoter composition according to claim 1, wherein the proportion of compound V is 0.1 to 10% by weight, based on the total adhesion promoter composition.

7. A method for undercoating adhesives, sealants, or coatings comprising:
   adding the two-component adhesion promoter composition according to claim 1 to at least one or a combination of adhesives, sealants, and coatings.

8. The method according to claim 7, wherein the adhesive or sealant is a polyurethane adhesive or sealant.

* * * * *